Feb. 26, 1957  F. J. CARNES  2,782,757
TIRE SIDE WALL STRIPING DEVICE
Filed April 27, 1954  2 Sheets-Sheet 1
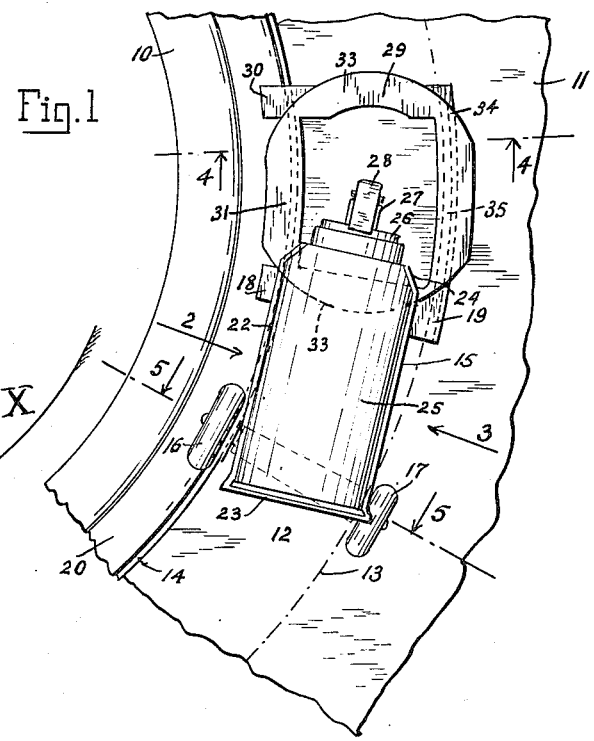
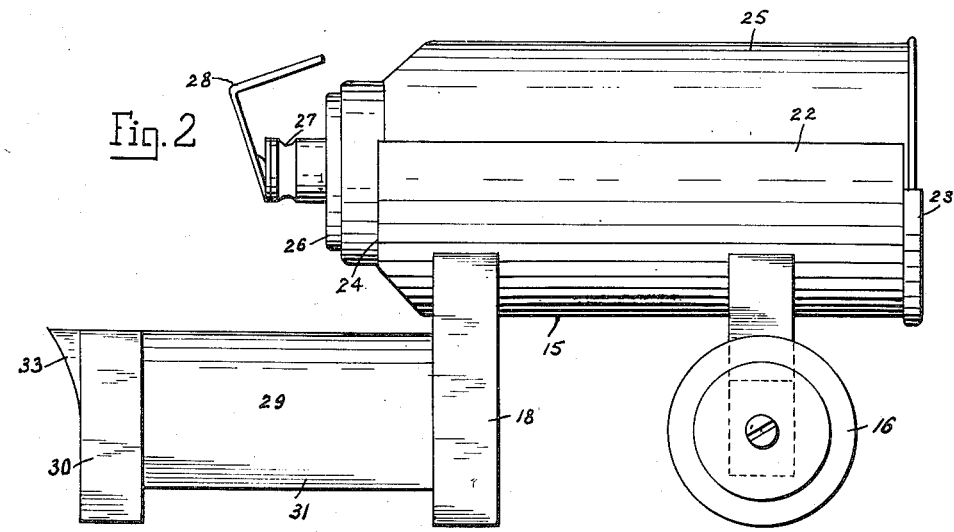
INVENTOR.
Francis J. Carnes
BY
Sigmund Herzog Feb. 26, 1957 F. J. CARNES 2,782,757
TIRE SIDE WALL STRIPING DEVICE
Filed April 27, 1954 2 Sheets-Sheet 2
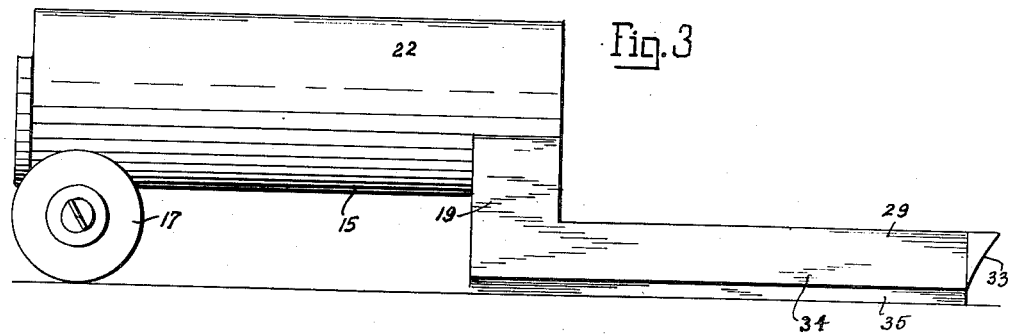
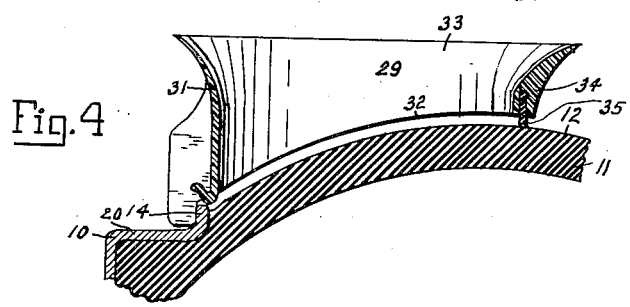
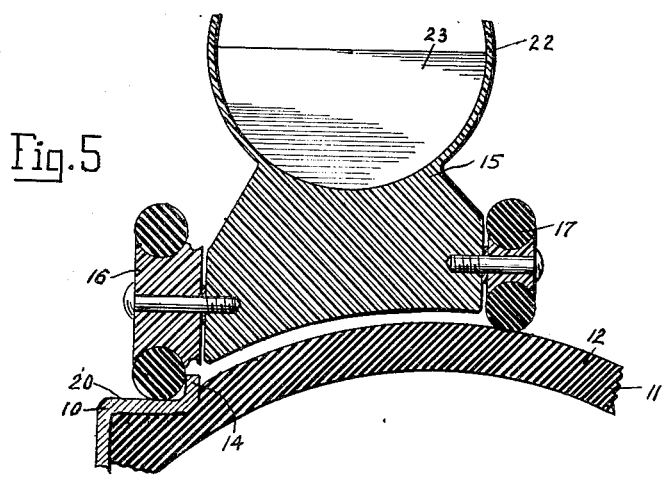
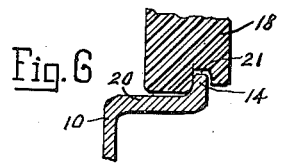
INVENTOR.
Francis J. Carnes
BY
Sigmund Herzog

United States Patent Office

2,782,757
Patented Feb. 26, 1957

2,782,757

TIRE SIDE WALL STRIPING DEVICE

Francis J. Carnes, West Roxbury, Mass.

Application April 27, 1954, Serial No. 425,839

4 Claims. (Cl. 118—301)

The present invention relates to improvements in a device for applying a decorative coating to the side walls of pneumatic automobile tires, and has particular reference to a device whereby an annular stripe of, preferably, white paint or other coating material may be sprayed on the side wall of a tire.

The white walls of tires have to be recoated from time to time and, also, sometimes it is found desirable to improve the appearance of ordinary, used tires by applying a white stripe of paint or like coating material thereto. Heretofore these operations have been produced by hand with the aid of a brush only.

One of the objects of the present invention is to provide a simple and relatively inexpensive coating applicator by means of which an annular stripe is adapted to be speedily and accurately applied to the side wall of a pneumatic tire without demounting the latter from the vehicle.

Another object of the invention is to provide a coating applicator of the type mentioned which is capable of being operated by anyone without special skill or training.

With these and other objects in view, which will more fully appear as the nature of the invention is better understood, the same consists in the combination, arrangement and construction of the parts hereinafter described, pointed out in the appended claims and illustrated in the accompanying drawings, it being understood that many changes may be made in the size and proportion of the several elements and details of construction within the scope of the appended claims, without departing from the spirit or sacrificing any of the advantages of the invention.

Generally speaking, the improved device comprises a work-supported bodily stationary coating applicator, past which the automobile wheel is rotated, said applicator including a cradle which carries a supply of coating material, dischargeable under pressure through a spray nozzle, the latter being directed to a work surface guard or protector which defines the width of the tire strip on which the spray issuing from the nozzle impinges. Means are provided for positioning the applicator on the tire rim for allowing relative movement between these two elements.

One of the many possible embodiments of the invention is illustrated in the accompanying drawings, in which:

Figure 1 is a side elevation of a portion of an automobile wheel with the improved coating device in position thereon;

Fig. 2 is an elevation, on a larger scale, of the coating device, looking in the direction of the arrow 2 shown in Fig. 1;

Fig. 3 is an elevation of the coating device, looking in the direction of the arrow 3 shown in Fig. 1; Fig. 3 being drawn on the scale of Fig. 2;

Fig. 4 is a section taken on line 4—4 of Fig. 1, drawn on the scale of Fig. 2;

Fig. 5 is a section taken on line 5—5 of Fig. 1, drawn on the scale of Fig. 2; and Fig. 6 is a section taken through a portion of the wheel rim and the means of the applicator which serves to position the latter on the automobile wheel.

In the drawings, the numeral 10 indicates the rim of an automobile wheel, having mounted thereon in the usual manner a pneumatic tire 11, provided on one of its sides 12 with an annular white stripe of paint or other suitable coating material, said stripe extending from said rim to the dot-dash line 13 on the tire side. The width of the stripe usually depends on the size of the tire. On each side of the tire, the rim 10 terminates in an annular flange 14, which projects outwardly from the wheel substantially at right angles to the center plane of the latter. The flange 14 adjacent to that side of the tire which is to be coated, in a manner hereinafter to be described, serves as the means for supporting the coating applicator.

The applicator comprises a carriage 15, mounted on wheels 16, 17 and on feet 18 and 19. The wheel 16, larger than the wheel 17, is adapted to make rolling contact with an annular flange 20 of the rim 10, while the wheel 17 is in contact with the tire side 12, when the carriage is mounted on the automobile wheel. The foot 18, higher than the foot 19, is provided in its underface with a notch 21, fitting the rim flange 14, as shown in Fig. 6. The foot 19 is adapted to bear against the tire side 12. The carriage includes a crib 22, which is substantially semicylindrical. The forward end 23 of the crib is closed, its open rear end being constricted (Fig. 1). The crib is adapted to receive a can 25, containing the desired tire coating material under pressure. As usual in constructions of this type, the can top 26 is provided with a valved nozzle 27, controlled by an operating device 28, which in the case illustrated in the drawings is in the form of a lever. The bottom of the can abuts against the closed forward end of the crib, while the nozzle 27 projects through and beyond the constricted rear end 24 of the crib. From the foregoing it appears that the applicator includes a spray gun and carries a supply of the coating material to be applied to the tire.

On the carriage 15 is also mounted a guard or protector 29, to confine the spray to a desired area of the tire. This protector is substantially in the form of a hopper which is fixed to the feet 18 and 19 of the carriage. The forward end of the hopper is supported by a foot 30, which is similar in construction to the foot 18 above referred to in that it is provided with a notch in its underface for engagement with the rim flange 14. The bottom edge of the longitudinal wall 31 of the hopper is adapted to engage throughout its length the rim flange 14 (Fig. 4), while the bottom edges 32 of the transverse walls 33 of the hopper are spaced from the tire side, when the applicator is positioned on the tire (Fig. 4). The bottom edge of the longitudinal wall 34 of the hopper is curved on the radius of the dot-dash line 13, it being spaced from the tire side (Figs. 3 and 4) and provided with a rubber strip 35, projecting downwards from the wall 34 into contact with the tire side beyond the dot-dash line 13 (Fig. 1).

The can nozzle 27 is extended over the guard 29 (Figs. 1 and 2), the outlet orifice of the nozzle being directed toward the tire side, when the applicator is mounted on the vehicle wheel.

To prepare the automobile wheel for the coating operation, it is necessary to jack up the wheel axle so as to render the wheel rotatable by hand. In operation, the applicator, with the pressurized coating material containing can thereon, is placed onto the vehicle wheel, the applicator being accurately positioned with respect to the predetermined area to receive the coating material by engaging the notches 21 in the feet 18 and 30 with the rim flange 14 and, thereby, contacting the carriage wheels 16 and 17 with the rim 10 and the tire side 12, respectively. In these positions of the elements, the rubber strip 35 is in contact with the said tire side beyond the dot-dash line 13 (Fig. 1). The applicator is held on the automobile wheel by grasping the carriage 15 with one hand. The operator then, with the other hand, slowly turns the said wheel in the direction of the arrow X shown in Fig. 1 of the drawings, and shifts the operating lever 28 to nozzle operating position with the carriage grasping hand. A spray of coating is thereby directed through the guard to the tire side; more particularly to that area of the side which lies between the rim flange 14 and the dot-dash line 13. As the vehicle wheel is being slowly turned in the direction of the arrow X (Fig. 1) and has completed a turn, an annular strip of the tire side is covered with the coating material, the rubber strip 35 sharply defining the outer circle of the annular strip so obtained. Since the bottom edges of the transverse walls 33 of the hopper are spaced from the tire side, the smoothness of the coat applied to the tire side is not interfered with during the coating operation.

Preferably, the applicator is made of a suitable plastic material, although this is not essential as far as the principle of the invention is concerned.

I claim:

1. A device for spraying an annular strip of a vehicle tire side, comprising a carriage, means on said carriage for cooperating with a portion of the rim holding said tire for maintaining the position of the carriage on a portion of the tire side adjacent the rim, said means being constructed and arranged to permit rotation of said tire side in relation to said carriage, a container mounted on said carriage provided with a spray nozzle and holding a supply of spraying material under pressure, and a guard on said carriage in the form of a hopper positioned to receive a spray from said nozzle and constructed and arranged to limit the spray to the width of said strip.

2. In a device according to claim 1, said hopper having longitudinal and transverse walls, the bottom edges of said transverse walls being arranged above the points of contact of said carriage with said tire side at a distance from the latter which is greater than the thickness of the stripe to be applied to said tire side, one of said longitudinal walls being in contact throughout its length with the rim, and a resilient strip on the bottom edge of the other one of said longitudinal walls for contact throughout its length with said tire side.

3. In a device according to claim 2, said means for maintaining the position of the carriage on a portion of the tire side adjacent the rim including two wheels and two feet on which said carriage is mounted, one of said wheels, larger than the other, being adapted to make rolling contact with the rim and the smaller wheel being arranged for rolling contact with said tire side, and one of said feet, longer than the other, being provided in its underface with a notch for receiving an annular flange on the rim and the other one of said feet being adapted to rest on said tire side.

4. In a device according to claim 1, said means for maintaining the position of the carriage on a portion of the tire side adjacent the rim including two wheels and two feet on which said carriage is mounted, one of said wheels, larger than the other, being adapted to make rolling contact with the rim and the smaller wheel being arranged for rolling contact with said tire side, and one of said feet, longer than the other, being provided in its underface with a notch for receiving an annular flange on the rim and the other one of said feet being adapted to rest on said tire side.

References Cited in the file of this patent

UNITED STATES PATENTS

| | | |
|---|---|---|
| 1,741,997 | Lerch | Dec. 31, 1929 |
| 1,927,743 | Ivey | Sept. 19, 1933 |
| 2,119,043 | Corneilson | May 31, 1938 |
| 2,424,202 | Woolery | July 15, 1947 |
| 2,543,395 | Woellwarth | Feb. 27, 1951 |
| 2,647,793 | Mosher | Aug. 4, 1953 |